(12) United States Patent
Lippman

(10) Patent No.: US 6,544,042 B2
(45) Date of Patent: Apr. 8, 2003

(54) COMPUTERIZED PRACTICE TEST AND CROSS-SELL SYSTEM

(75) Inventor: Barry Lippman, New York, NY (US)

(73) Assignee: Learning Express, LLC, New York, NY (US)

( * ) Notice: Subject to any disclaimer, the term of this patent is extended or adjusted under 35 U.S.C. 154(b) by 75 days.

(21) Appl. No.: 09/837,636

(22) Filed: Apr. 13, 2001

(65) Prior Publication Data

US 2002/0039722 A1 Apr. 4, 2002

Related U.S. Application Data

(60) Provisional application No. 60/197,850, filed on Apr. 14, 2000.

(51) Int. Cl.[7] ................................................. G09B 3/00
(52) U.S. Cl. ....................................... 434/322; 434/350
(58) Field of Search ............................... 434/322, 323, 434/353, 354, 350, 362, 118

(56) References Cited

U.S. PATENT DOCUMENTS

| | | | |
|---|---|---|---|
| 5,827,070 A | 10/1998 | Kershaw et al. | 434/322 |
| 5,911,581 A | 6/1999 | Reynolds et al. | 434/236 |
| 5,947,747 A | 9/1999 | Walker et al. | 434/354 |
| 5,987,302 A | 11/1999 | Driscoll et al. | 434/353 |
| 6,120,299 A | 9/2000 | Trenholm et al. | 434/323 |
| 6,234,806 B1 | 5/2001 | Trenholm et al. | 434/322 |
| 6,288,753 B1 * | 9/2001 | DeNicola et al. | 348/586 |
| 2001/0031457 A1 * | 10/2001 | Pfenninger et al. | 434/350 |
| 2002/0086275 A1 * | 7/2002 | Boney et al. | 434/350 |

* cited by examiner

Primary Examiner—Hieu T. Vo
(74) Attorney, Agent, or Firm—Davidson, Davidson & Kappel, LLC

(57) ABSTRACT

A system is provided for providing a consumer, via the Internet or other global information network, with a practice test for a desired standardized test. In accordance with the present invention, a consumer who wishes to take a practice test accesses the system via a remote electronic connection such as the Internet, other global information network, or direct point-to-point telephone connection. Upon accessing the system, the consumer selects and takes an on-line practice test. The system calculates the consumer's score on the practice test, and recommends appropriate study aids to the consumer based upon the consumer's score. The consumer then has the option of electronically purchasing the recommended study aid through the system.

19 Claims, 7 Drawing Sheets

Phase 1: Test Development

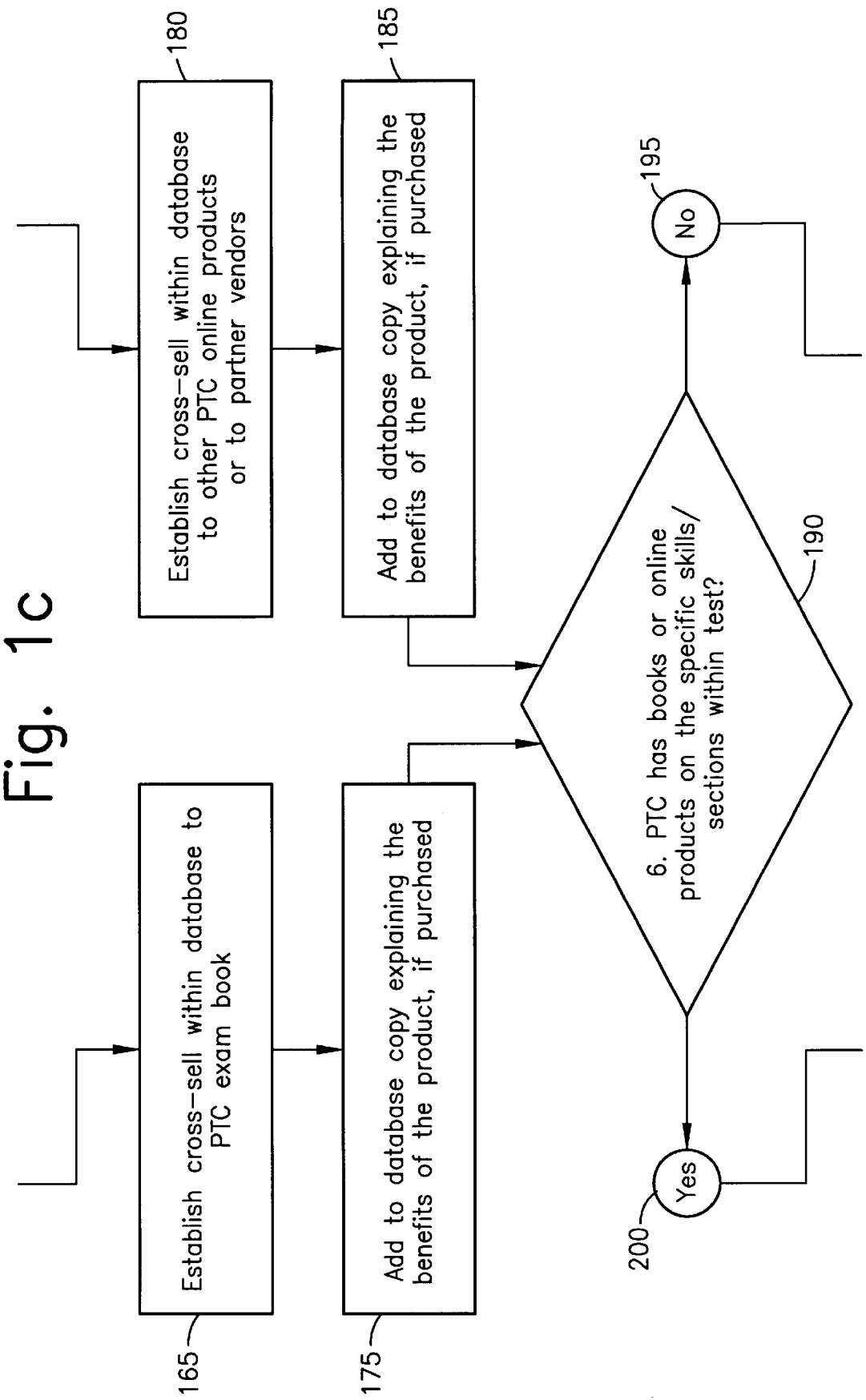

COMPUTERIZED PRACTICE TEST AND CROSS-SELL SYSTEM

This application claims priority from Provisional Application Ser. No. 60/197,850, entitled Computerized Practice Test and Cross-Sell System, filed Apr. 14, 2000, the entire disclosure of which is hereby incorporated by reference.

FIELD OF THE INVENTION

The present invention relates to the field of test exam preparation.

BACKGROUND OF THE INVENTION

A wide variety of business and educational institutions utilized standardized tests to evaluate applicants for employment or admission. Such tests include civil service tests for governmental positions, professional licensing exams, vocational licensing exams, college placement exams, and high school proficiency exams. Examples include the EMT-Basic exam, Paramedic Exam, Texas Academic Skills Program, and civil service exams for police and fire departments.

In order to increase the likelihood that they will be admitted to the educational or business institution of their choice, many applicants prepare for standardized tests by taking practice tests.

SUMMARY OF THE INVENTION

In accordance with the present invention, a system is provided for providing a consumer with an on-line practice test for a desired standardized test. In accordance with the present invention, a consumer who wishes to take a practice test accesses the system via a remote electronic connection such as the Internet, other global information network, or direct point-to-point telephone connection. Upon accessing the system, the consumer selects and takes an on-line practice test. The system calculates the consumer's score on the practice test, and recommends appropriate study aids to the consumer based upon the consumer's score. Preferably, the system analyzes score results by skill area, and recommends appropriate study aids based upon the consumer's score in individual skill areas. The consumer then has the option of electronically purchasing the recommended study aid through the system.

In accordance with a preferred embodiment of the present invention, the consumer accesses the system server from a client computer (e.g. his or her personal desktop or laptop computer) via a "Practice Test Company" web page, and selects and takes the on-line practice test by sequencing through a plurality of web pages in a conventional manner. Preferably, the consumer is allowed to select from a plurality of practice tests which relate to a plurality of standardized tests, such as civil service exams, academic exams, and professional licensing exams. Upon selecting a desired practice exam, the consumer purchases the on-line practice exam by providing credit card or other billing information to the system. Prior to, or after purchasing the on-line practice exam, the consumer selects (or is automatically provided with) a unique user ID which is used by the system to store the consumer's test results, and to provide the user with access thereto.

The consumer may then proceed to take the test on-line, with the test questions displayed on, and answers input to, a plurality of web pages. Preferably, the consumer is provided with an unlimited amount of time to take the test. In addition, the consumer may stop the test at any time, and then return to complete it later, with the results stored under the unique user ID referenced above. Most preferably, however, the consumer is provided with only a limited amount of time to complete a given portion of the exam (e.g. 5 minutes), in order to more closely resemble test conditions. Once the consumer has completed the on-line practice test, the system automatically calculates and displays the consumer's overall score on the test, as well as the consumer's score on individual skills or content areas within the test.

In this regard, each question on the on-line practice test is assigned to a specific skill or content area in the system database, and each test has one or more skills or content areas. In certain embodiments, each test may include 3 or more skill or content areas.

In general, skill areas relate to fundamental skills such as reading, writing, and math, and content areas relate to specific disciplines such as science, literature, arts, and to profession-specific information. In any given test, the skill or content areas may be physical (the test is actually displayed in sections with all questions in one skill or content area grouped together) or logical (questions in the various skills are mixed throughout the test, so that the section division is invisible to the user). In either case, the system tracks the user's performance using the skill or content area as assigned to each question.

Concurrently with, or subsequent to, display of the overall and individual test scores to the consumer, the system automatically provides recommendations on additional study aids to the consumer. Preferably, the system provides each consumer with a recommendation of at least one additional study aid designed to help increase the consumer's score on the test as a whole.

In addition, the system may also make additional study aid recommendations based upon the consumer's score on the individual skill and content areas of the test. In this regard, for each skill and content area of the test, the system maintains a separate cut-off score (e.g. 60%) or cut-off range (e.g. 60%–70%). If the consumer's score in a given individual skill or content area falls below a cut-off score or within a cut-off score range, the system may recommend a study aid which is specifically directed to that particular skill or content area. If the consumer's score in a given individual skill or content area is not within the cut-off score range (or is above the cut-off score), the system will not make a recommendation for that skill or content area. For example, one set of products can be recommended for a score cut-off score range between 50% and 60%, while another set of products can be recommended for a cut-off score range between 61% and 70%. Alternately, cut-off score can be set to 60%, and a product recommended on any score of 60% or less. It should be noted that the system may or may not have a study aid to recommend for each skill or content area. Moreover, the study aid can be in a variety of forms, including, books, videos, CD ROMS, and on-line products. In an alternative embodiment, the study aid based on the test as a whole is omitted, and the consumer is provided only with study aid recommendations based upon the consumer's score on the individual skill and content areas of the test may include 3 skill or content areas. In any event, after receiving the recommendations, the consumer is provided with the opportunity to purchase the recommended study aids on line via, for example, a direct click through to product database and shopping cart system.

BRIEF DESCRIPTION OF THE DRAWINGS

FIGS. 1(A) through 1(D) (collectively referred to hereinafter as "FIG. 1") shows a flow chart for the generation of a new on-line practice test in accordance with a preferred embodiment of the invention.

DETAILED DESCRIPTION OF THE PREFERRED EMBODIMENT

The preferred embodiment of the present invention will now be described in detail with reference to FIGS. 1 through 3. Although the system and method of the present invention will be described in connection with these preferred embodiments and drawings, it is not intended to be limited to the specific form set forth herein, but on the contrary, it is intended to cover such alternatives, modifications, and equivalents, as can be reasonably included within the spirit and scope of the invention as defined by the appended claims.

In the description that follows, the on-line testing system will be described as a web-based system which is accessed over the Internet via a "Practice Test Company" web page. In accordance with this preferred system, a consumer selects and takes the on-line practice test by sequencing through a plurality of web pages in a conventional manner.

I. Generation and Updating of Test Database

Figure 1A:
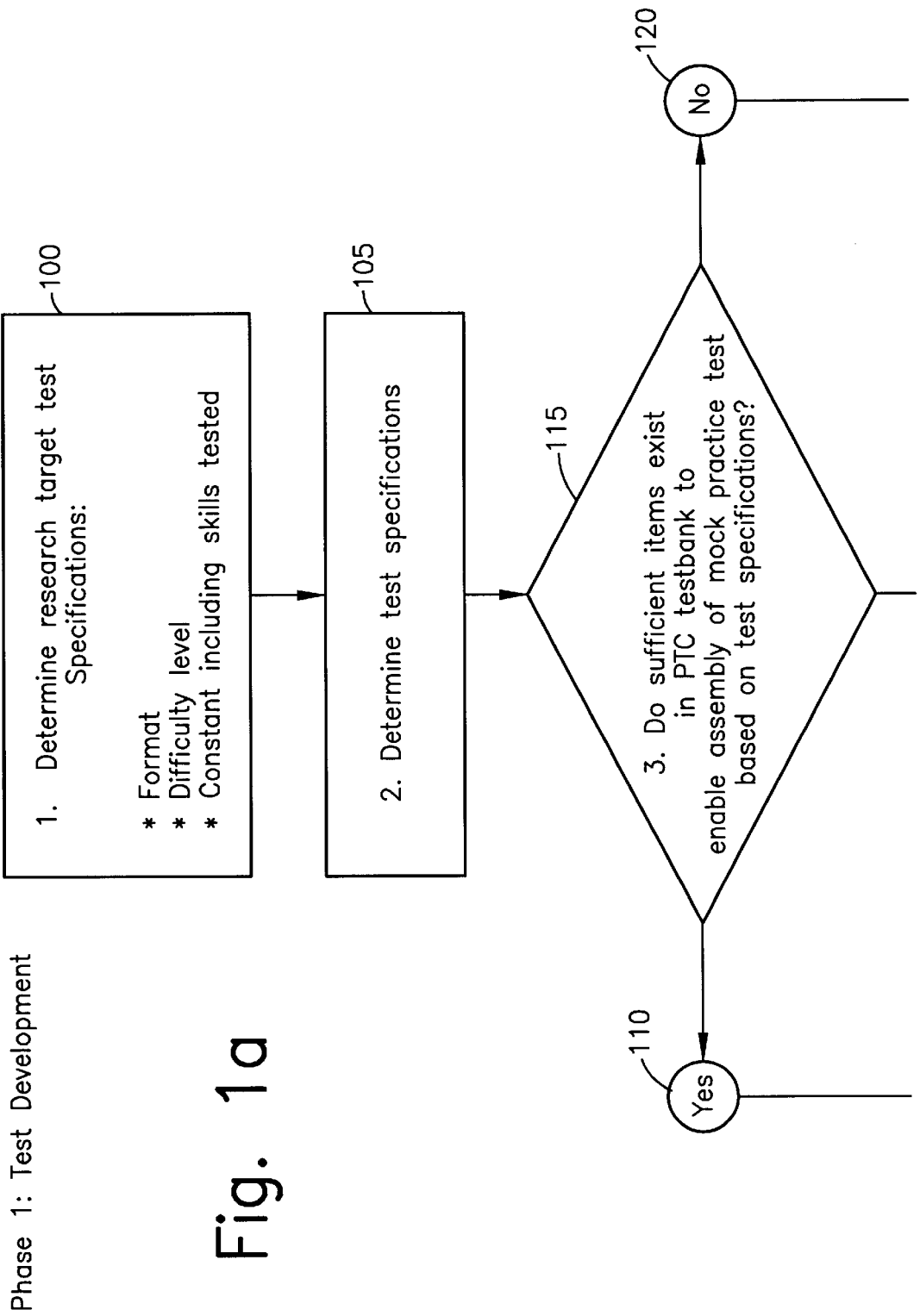
Figure 1B:
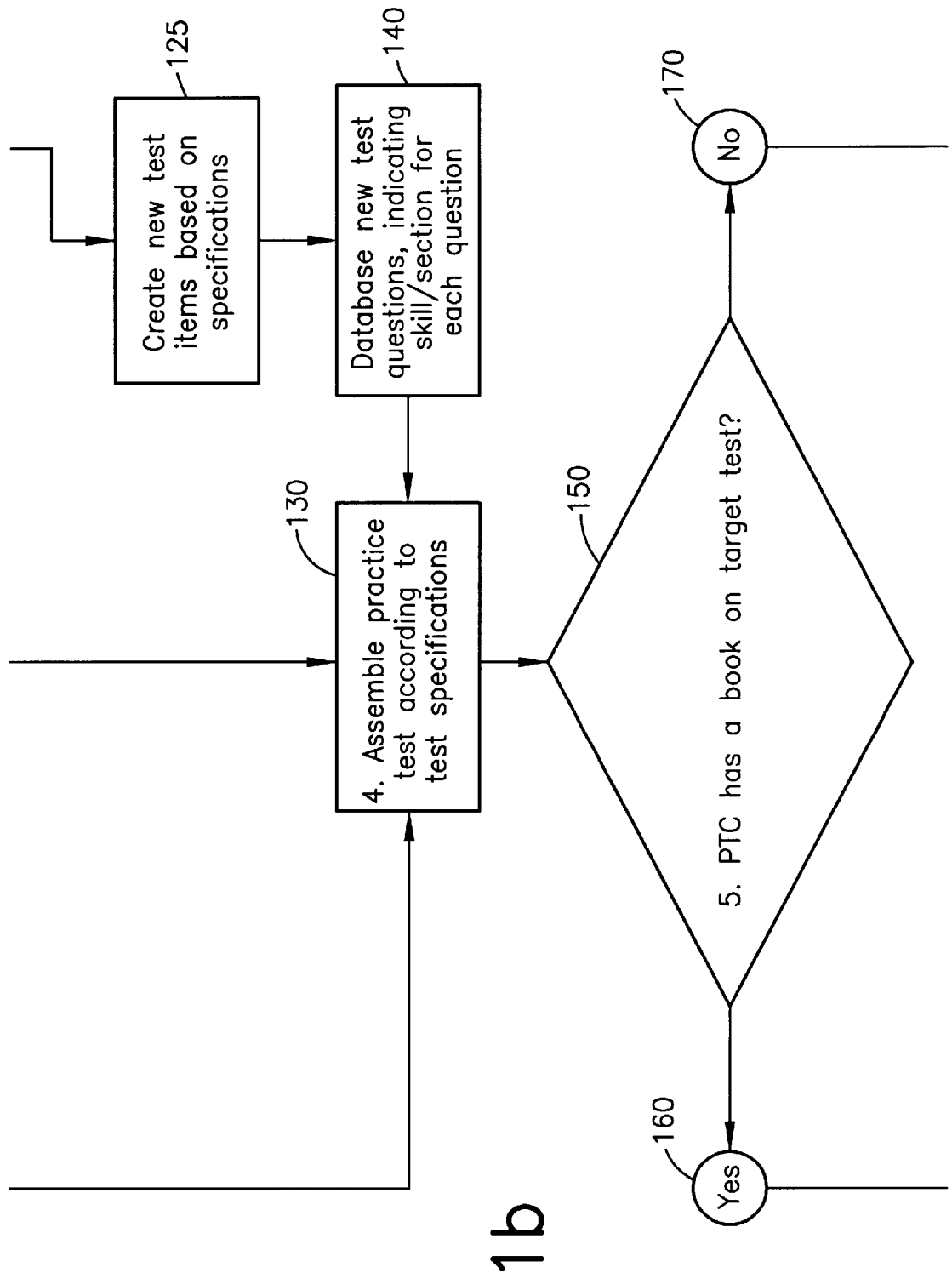
Figure 1D:
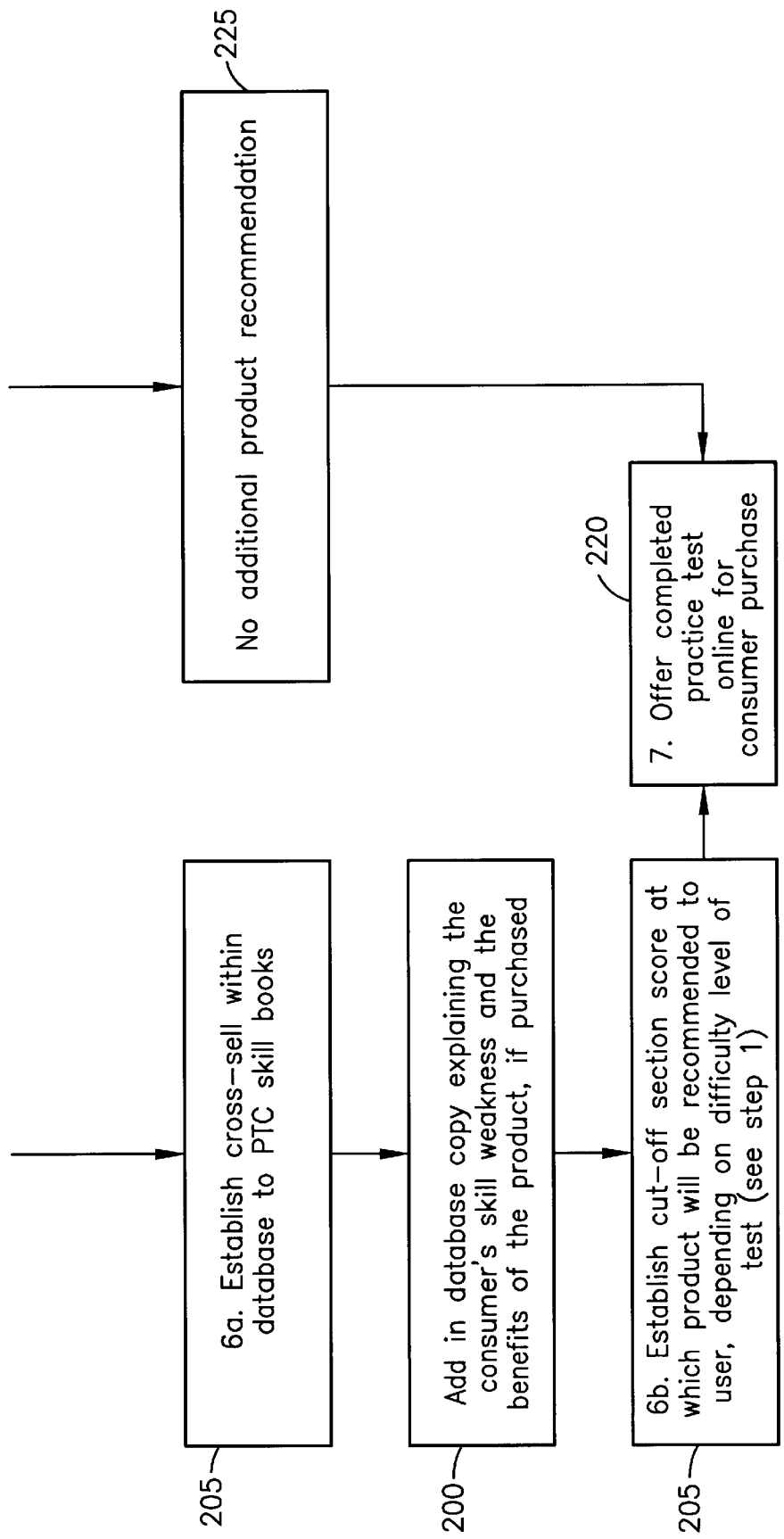

FIG. 1 illustrates a preferred method in accordance with the present invention for developing a new on-line practice test. In steps 100 and 105, the new test specifications are developed, which include the format for the new on-line practice test, the difficulty level of the test, and the content of the test, including the skills tested. The format of the test may, for example, include the type of question format (e.g., multiple choice, fill in the blank, short answer), and the organizational format (e.g., with specific skill areas such as reading and grammar in separate sections, or with all skill areas inter-dispersed). The difficulty level of the test preferably includes the difficulty level of the questions (e.g., the Grade Level of the questions), and the "passing grade" percentage for the test. The content of the test is comprised of the content areas and skills tested. Once the test specification are determined, a system test bank is examined (step 115) to determine if sufficient pre-existing test specifications exist to create the new practice test.

Figure 3A:
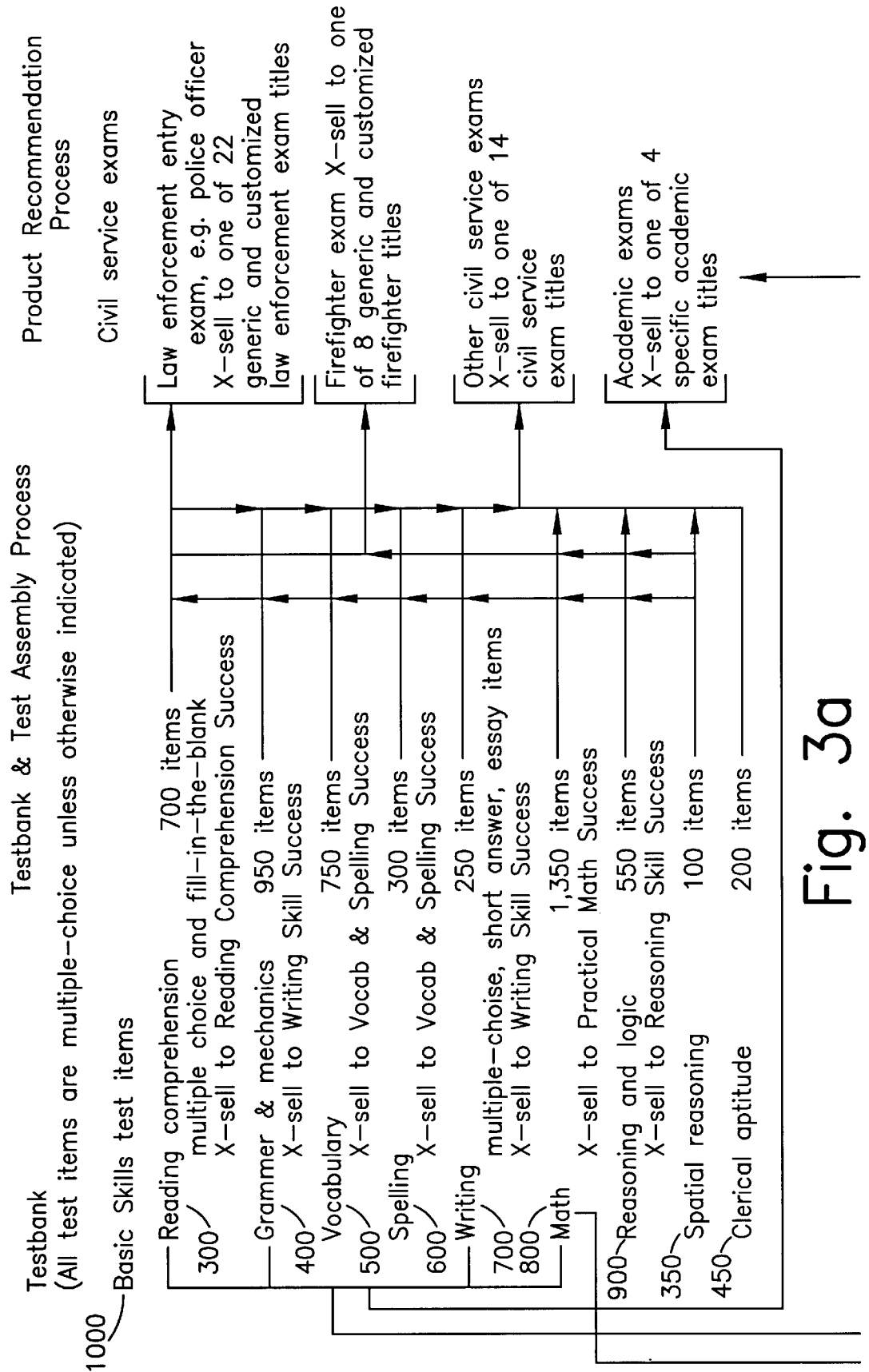
FIGS. 3(A) and 3(B) (collectively referred to hereinafter as "FIG. 3") show an illustrative test bank stored in a database in accordance with a preferred embodiment of the invention.
Figure 3B:
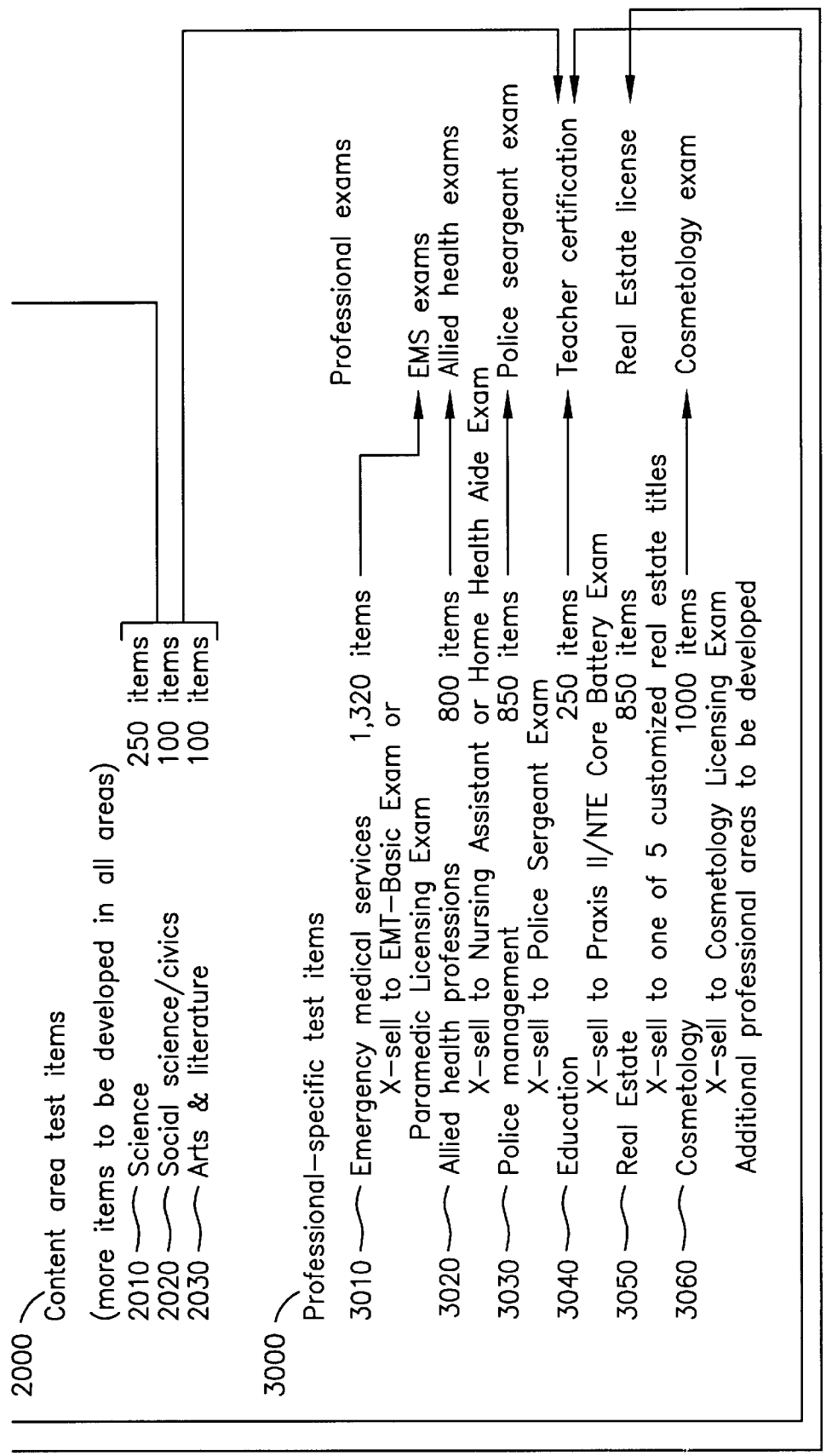

FIG. 3 provides an illustration of a test bank contained in a database in accordance with the present invention. In general, it should be understood that the test bank of FIG. 3 is dynamic in that as additional practice tests are developed, they are added to the test bank. The test bank is preferably divided into a basic skills section 1000, a content area section 2000, and a profession specific section 3000. In the exemplary test bank of FIG. 3, the basic skills section 1000 includes seven sub-categories: reading comprehension 300 with 700 items (e.g. questions), grammar and mechanics 400 with 950 items; vocabulary 500 with 750 items; spelling 600 with 300 items; writing 700 with 250 items; math 800 with 1350 items; reasoning and logic 900 with 550 items; spatial reasoning 350 with 100 items; and clerical aptitude 450 with 200 items. The content area section 2000 includes three sub-categories: science 2010 with 250 items; social sciences/civics 2020 with 100 items; and arts and literature 2030 with 100 items. The exemplary test bank database also includes six sub-categories for profession specific test items 3000: emergency medical services 3010 with 1320 items; allied health professions 3020 with 800 items; police management 3030 with 650 items; education 3040 with 250 items; real estate 3050 with 850 items; and cosmetology 3060 with 1000 items.

As indicated in FIG. 3, the items in each sub-category may be in a number of formats such as multiple choice (which in the exemplary test bank are listed in all sub-categories), fill in the blank (shown in sub-category 300), essay (shown in sub-category 700), and short answer (shown in sub-category 700).

In accordance with the present invention, each subcategory in the database may be linked or associated with one or more additional study aids which, as described below, may be cross-sold to consumers who have taken the on-line tests offered by the system. In FIG. 3, for example, the grammar and mechanics 400 sub-category is linked or associated in the database with a product called "Writing Skills Success", the allied health professions 3020 sub-category is linked or associated in the database with both a "Nursing Assistant Exam" product and a "Home Health Aide Exam" product, whereas the spatial reasoning 350 sub-category currently has no additional study aids associated with it. In general, it should be noted that the additional study aids can comprise a wide variety of products including books, video tapes, audio tapes, CD ROMs; and on-line services and products.

Referring again to FIG. 1, step 115, based upon the format, content, and difficulty level of the new practice test, the test bank database is examined to determine whether sufficient items exist to create the practice test. In this regard, it should be noted that standardized tests are generally written to a particular difficulty level, which, in the United States is generally described in terms of High School Grade Level. For example, a teacher certification exam might be assigned a $12^{th}$ Grade reading difficulty level, whereas a general civil service exam might be assigned a $6^{th}$ Grade reading difficulty level. Referring to FIG. 3, the 700 items in the reading comprehension sub-category 300 might include 200 items at a $6^{th}$ Grade level, 200 items at a $9^{th}$ Grade level; 150 items at a $10^{th}$ Grade level, and 150 items at a $12^{th}$ Grade level. Therefore, to determine whether sufficient items exist in the test bank to create the practice test, each skill in the content of step 100 is compared with the subcategories of the test bank, and if a match is found to a sub-category, the sub-category is examined to determine if sufficient items exist which also match the desired difficulty level and format (e.g. multiple choice, essay, fill-in the blank). If a match is found for each skill in the desired content of the new test (step 110), the practice test is assembled according to the test specification. If one or more of the skills, format, and difficulty level for the test is not found in the database (step 120), then additional items for the database are created by an individual of appropriate skill (step 125), and the new test items are added to the database in the appropriate section and/or sub-category (step 140). If necessary, additional sections or sub-categories may be added. If additional sub-categories are added, additional study aids may also be linked or associated with the sub-category in the database.

At step 130, the new practice test is assembled according to the test specifications. In this regard, specific items from the database are incorporated into a complete practice test in accordance with the test specifications.

If the system has a "Practice Test Company" branded study aid which is directed to the practice test (e.g., an EMT Basic prep book) (steps 150 and 160), then a link or association is established in the database between the new practice test and the study aid to allow the study aid to be cross-sold with the new practice test (step 165). A description is then added to the database, and associated with the practice test which explains the benefits of the study aid to the consumer (step 175).

If the system does not have a "Practice Test Company" branded study aid which is specifically directed to the practice test (steps 150 and 170), then an attempt is made to find an appropriate cross-sell to the new practice test, either to other more general "Practice Test Company" branded study aid products, or to products of partner vendors. A description is then added to the database, and associated with the practice test which explains the benefits of the study aids to the consumer (step 185).

Referring to step 190, if the system has one or more study aids related to the specific sub-categories of the test bank database (step 200), then a link or association is established in the database between the new practice test and the study aid to allow the study aid to be cross-sold with the new practice test (step 205). In this regard, the test bank in the database is consulted to see if any of the sub-categories have associated study aids. For example, if the new practice test included items from the reading comprehension sub-category 300, then a cross-sell would be established to the Reading Comprehension Success product. A description is then added to the database, and associated with the practice test, which explains the consumer's skill weakness and the benefits of the study aids to the consumer (step 210). A cut-off section score (step 215) is then set which will trigger a recommendation of the study to the consumer via the description of step 210. As an example, if the new practice test has a cut-off score for reading comprehension of 90%, then a cross-sell will only be initiated to a consumer if the consumer scores under 90% on the reading comprehension section of the practice test.

Returning to step 190, if the system has no study aids related to the specific sub-categories of the test bank database (step 195), then no additional product recommendations are made.

In any event, following step 215 or 225, the new practice test is completed and can be made available on line to consumers.

II. On-line Testing for Consumers

After a standardized test has been entered and cross-referenced in a database as described above, it is available to consumers in the manner described below via a remote electronic connection such as the Internet, another global information network, or a point-to-point telephone connection.

The process for a consumer selecting and taking an on-line practice test is as follows:

1. Consumer Selects Online Practice Test

Figure 2:
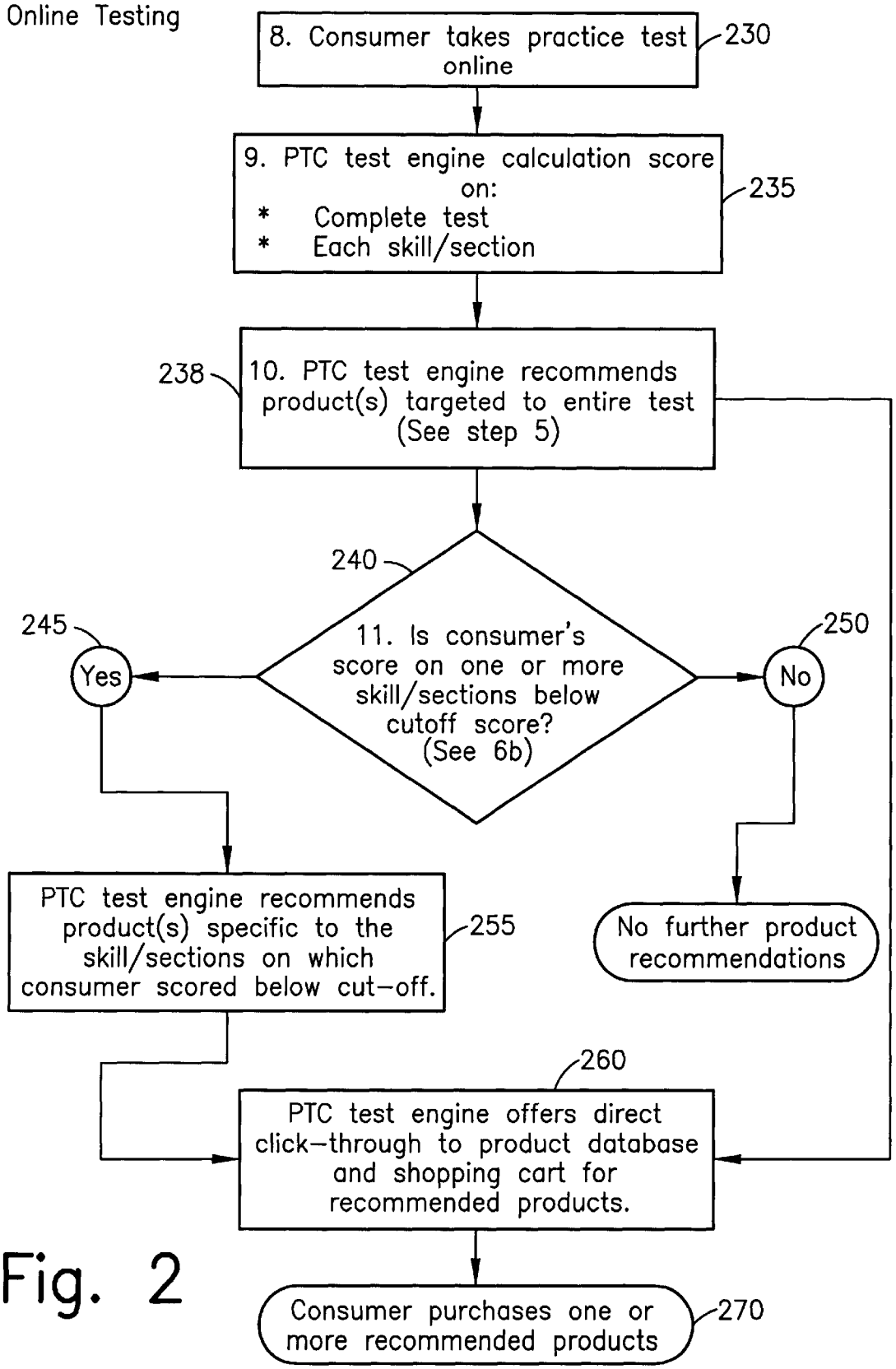
FIG. 2 shows a flow chart for on-line testing of an on-line practice test in accordance with a preferred embodiment of the invention.

Referring to FIG. 2, the process begins when a consumer selects a practice test to take online(step 230). In the illustrated embodiment, the "Practice Test Company" offers online practice tests in the following areas:

Civil service and other job-entry exams

Professional and vocational licensure and certification exams

Academic exams, including high school proficiency and college-level entrance and placement exams Each online practice test is customized by job title or specific test, and many are also customized by state or city, such as New York City Police Officer Exam or Texas Academic Skills Program test.

2. Consumer Logs In

The log-in process includes entry of typical information such as name, address, email, and phone. The consumer also selects a unique username and password. The system then generates a unique user ID that is used to store the consumer's test results. Payment is handled in one of two ways:

The consumer pays with a credit card.

The consumer is taking an online test via a site license arrangement with an institution such as a school or library, in which the institution has previously subscribed to receive access to a given set of online practice tests.

3. Consumer Takes Practice Test

The system allows consumers to take their practice test online with an easy-to-use, intuitive interface. Consumers may stop their test at any time and come back to it later; the system stores their results under the unique user ID generated in Step 2. Moreover, the system returns the consumer to the exact point in the test that the consumer was prior to stopping. If the test is timed, the user may re-enter the test with any time he or she has remaining. In addition, for tests which have time constraints, the system tracks the remaining time which the consumer has for the test or test section so as to more closely resemble actual test conditions. If the time runs out for a particular section, the user can be issued a warning that the time has expired. In certain embodiments, the user may also be prevented from completing the test. Moreover, in certain embodiments, the instructions and questions can be audio based (e.g., a digital audio stream).

4. Consumer Completes Practice Test

When the consumer has completed the practice test, hitting the final "submit" allows the system to calculate the consumer's score. The user may also be given the option of reviewing the questions and his or her answers.

5. Score Calculation

When a consumer has completed the test, the system automatically calculates and displays their score (step 235) on both:

a. the test as a whole b. the individual skill or content areas contained within the test The system calculates the scores on individual skill or content areas within the test as follows:

1. Every question is assigned to a specific skill or content area in the system database.

2. Every test has one or more skills or content areas

3. Within a given test, the skill or content areas may be physical (the test is actually displayed in sections with all questions in one skill or content area grouped together) or logical (questions in the various skills are mixed throughout the test, so that the section division is invisible to the consumer).

4. Regardless of whether the sections are physical or logical, the system tracks the consumer's performance using the skill or content area as assigned to each question.

As an example, an online New York City Police Exam might have the following sections:

Reading comprehension

Written expression

Reasoning

Spatial relations

Math

However, these sections are invisible to the consumer, as the test is not physically divided into these areas. Rather, a reading question might be followed by a math question and then a written expression question.

Nevertheless, the system tracks the user's performance on each type of question and calculates a section score for each virtual "section."

6. Recommendation of Product(s) Targeted to Entire Test

As an integral part of the consumer's score report, the system displays a recommendation for one or more print or online products that are designed to help users increase their score on the test as a whole. This can be done during any part of the test. For example, the recommendation can be made during the subsection of the test, the section of the test, or during different levels of the test.

For example, consumers who have taken the online New York City Police Office Exam receive a recommendation to purchase the books Police Officer Exam New York City and The Secrets of Taking Any Test.

In addition, the system may recommend print or on-line products that are directed to particular skill areas within the test. For example, books of instruction and practice, and possibly online courses, could be provided for the following basic skills:

Reading

Writing

Vocabulary and spelling

Math

Reasoning and logic

Exams that test such skills include civil service and job entry exams, most academic exams, and even some professional exams such as teacher certification tests. Therefore, the same recommendation might be provided to a consumer with poor reading skills, regardless of whether the consumer took the Treasury Enforcement Exam or a civil service exam.

In accordance with the preferred embodiment of the invention,

1. The system identifies the skill or content areas of a given test and displayed the user's score on each of those areas.
2. It then checks each of those skill or content areas to see if they have been assigned, in its database, product(s) designed to increase the user's score on those areas.
3. If such a product has been assigned to one or more skill or content areas, the test engine proceeds with Step 7.

For Example, referring to FIG. 3, the skill areas of the New York City Police Exam have been assigned the following products:

| | |
|---|---|
| Reading comprehension | Reading Comprehension Success in 20 Minutes a Day |
| Written expression | Writing Skills Success in 20 Minutes a Day |
| Reasoning | Reasoning Skills Success in 20 Minutes a Day |
| Spatial relations | no recommendation |
| Math | Practical Math Success in 20 Minutes a Day |

For those tests for which the system does not have products assigned to particular skill or content areas, no further product recommendations are made. In certain embodiments, if the user has already purchased one or more of the recommended products, the user is notified that he or she has already purchased the product. This can be done, for example, by highlighting the product that has already been purchased.

7. Score Evaluation

The system engine now checks the consumer's score on each individual skill or content area within the test against a cut-off score established by the system test experts within its database. In this regard, the questions can be weighted in calculating the score, e.g. a correct answer for one question more favorably affects the score than a correct answer for another question.

If the consumer's score on any given skill or content area falls below the established cut-off score, the system recommends the product(s) assigned to that skill or content area. This process is repeated until the user has received a recommendation in each area in which he/she scored below the cut-off score.

If the consumer's score on all the skill or content areas falls above the established cut-off score, no additional products are recommended.

For example, on the system's New York City Police Exam practice test, User A scores 90 percent. Her scores on the individual skill areas are:

| | |
|---|---|
| Reading comprehension | 98 percent |
| Writing | 96 percent |
| Reasoning | 82 percent |
| Spatial relations | 75 percent |
| Math | 68 percent |

The cut-off score for the skill areas on the New York City Police Exam is 95 percent. User A will therefore receive a recommendation to purchase not only the books New York City Police Exam and The Secrets of Taking Any Test, but also Reasoning Skills Success in 20 Minutes a Day and Practical Math Success in 20 Minutes a Day, because her scores in Reasoning and Math are below 95 percent. Reading Comprehension Success and Writing Skills Success will not be displayed because User A scored above 95 percent in those areas.

In certain embodiments of the present invention, the score on the practice test can be "scaled" to correspond to the scoring convention of the actual test. For example, the Scholastic Aptitude Test is based upon a scale of 0–1600 points. A score of 80/100 on a corresponding practice test with 100 questions might be "scaled", in accordance with the present invention, to a corresponding score of 1280/1600.

8. Purchasing

The system offers direct click-through to product database and shopping cart for recommended products. From the score report/recommendation page, the system offers direct click-through to the product database, where consumers can obtain more information about the recommended products, and/or directly to the shopping cart. In certain embodiments, if the user has already purchased one or more of the recommended products, the user is notified that he or she has already purchased the product. This can be done by, for example, highlighting the product that has already been purchased.]

III. Exemplary Cross-selling for Practice Tests

In the far right column of FIG. 3, illustrative associations are shown between various on-line practice tests and: the basic test skills section 300 and associated cross-sold products, the content area section 2000 and associated cross-sold products (in this case, there are none); and the profession specific section 300 and associated cross-sold products.

Specifically, law enforcement entry exams (e.g. police officer exams) might include the following sub-categories of questions (with their associated cross-sells): reading comprehension 300, grammar and mechanics 400, vocabulary 500, spelling 600, writing 700, math 800, reasoning and logic 900, and spatial reasoning 350. In contrast, firefighter entry exams might include only the following sub-categories of questions (with their associated cross-sells): math 800, reasoning and logic 900, and spatial reasoning 350.

Academic exams, in turn, might include, the following sub-categories of questions (with their associated cross-sells): reading comprehension 300, grammar and mechanics 400, vocabulary 500, spelling 600, writing 700, math 800, science 2010, social science/civics 2020, and arts & literature 2030. A teacher certification exam, in contrast, might include the following sub-categories of questions (with their associated cross-sells): reading comprehension 300, grammar and mechanics 400, vocabulary 500, spelling 600, writing 700, math 800, science 2010, social science/civics 2020, arts & literature 2030, and education 3040.

What is claimed is:

1. A system comprising:
   a server, the server:
   receiving, from a client, a request to take an on-line practice test for a desired standardized test;
   providing a client, via a remote connection, with the on-line practice test;
   receiving, from the client, a set of answers for the on-line practice test;
   calculating a score for the client on the practice test;
   recommending an appropriate study aid to the client based upon the score;
   receiving, from the client, a request to purchase the recommended study aid; and
   selling the recommended study aid to the client.

2. The system as recited in claim 1 wherein the server:
   generates a first set of test questions relating to a first skill or content area, and storing said first set of test questions in a database;
   associates, in the database, a first study aid product with said first set of test questions, said first study aid product being related to said first skill or content area;
   generates a second set of test questions relating to a second skill or content area, and storing said second set of test questions in the database;
   associates, in the database, a second study aid product with said second set of test questions, said second study aid product being related to said second skill or content area;
   assembles a practice test, the practice test including at least a portion of one of the first and second sets of question, the practice test being stored in the database; and
   associates, in the database, a cut-off score for the practice test.

3. The system as recited in claim 1 wherein the server ceases receipt of the answers a pre-determined time after the client has started the practice test.

4. The system as recited in claim 1 further comprising a client, the client:
   sending, to the server, the request to take the practice test for the desired standardized test;
   accepting from the server, via the remote connection, the practice test;
   accepting, from a user, the set of answers for the practice test;
   sending, to the server, the set of answers for the practice test;
   receiving the recommendation of an appropriate study aid from the server; and
   sending, to the server, the request to purchase the recommended study aid.

5. The system as recited in claim 4 wherein the client further comprises:
   an ID sending function for sending an ID reference to the server; and
   a client retrieval function for retrieving the practice test based on the ID reference from the server.

6. The system as recited in claim 1 wherein the server further comprises:
   an ID receiving function for receiving an ID reference from the client;
   a storage function for storing the practice test based on the ID reference pursuant a storage request from the client; and
   a test retrieval function for retrieving the practice test based on the ID reference pursuant to a retrieval request from the client.

7. A computer readable medium, having stored thereon, computer executable process steps operative to control a computer to providing practice test services, the process steps comprising:
   receiving, from a consumer, a first request to take an on-line practice test for a desired standardized test;
   providing the consumer, via a remote connection, with the on-line practice test;
   receiving, from the consumer, a set of answers for the on-line practice test;
   calculating a score for the consumer on the practice test;
   recommending an appropriate study aid to the consumer based upon the score;
   receiving, from the consumer, a second request to purchase the recommended study aid; and selling the recommended study aid to the consumer.

8. A computer readable medium, having stored thereon, computer executable process steps operative to control a computer to create a database of practice test information, the process steps comprising:
   generating a first set of test questions relating to a first skill or content area, and storing said first set of test questions in a database;
   associating, in the database, a first study aid product with said first set of test questions, said first study aid product being related to said first skill or content area;
   generating a second set of test questions relating to a second skill or content area, and storing said second set of test questions in the database;
   associating, in the database, a second study aid product with said second set of test questions, said second study aid product being related to said second skill or content area;
   assembling a practice test, the practice test including at least a portion of one of the first and second sets of question, the practice test being stored in the database; and
   associating, in the database, a cut-off score for the practice test.

9. A method for creating a database of practice test information for providing on-line practice test services and for cross-selling of products, the method comprising the steps of:

generating a first set of test questions relating to a first skill or content area, and storing said first set of test questions in a database;

associating, in the database, a first study aid product with said first set of test questions, said first study aid product being related to said first skill or content area;

generating a second set of test questions relating to a second skill or content area, and storing said second set of test questions in the database;

associating, in the database, a second study aid product with said second set of test questions, said second study aid product being related to said second skill or content area;

assembling a practice test, the practice test including at least a portion of one of the first and second sets of question, the practice test being stored in the database; and associating, in the database, a cut-off score for the practice test.

10. A method for providing on-line practice test services and for cross-selling of products, comprising:

receiving, from a consumer, a first request to take an on-line practice test for a desired standardized test;

providing the consumer, via a remote connection, with the on-line practice test;

receiving, from the consumer, a set of answers for the on-line practice test;

calculating a score for the consumer on the practice test;

recommending an appropriate study aid to the consumer based upon the score;

receiving, from the consumer, a second request to purchase the recommended study aid; and selling the recommended study aid to the consumer.

11. The method of claim 10, wherein the on-line practice test includes a first set of test questions relating to a first skill or content area and a second set of test questions relating to a second skill or content area, and wherein the calculating step includes calculating a first score for the consumer based upon the first set of questions and a second score for the consumer based upon the second set of questions;

and wherein the recommending step includes:

recommending a first study aid to the consumer if the first score is below a first cut-off score, and recommending a second study aid to the consumer if the second score is below a second cut-off score.

12. The method of claim 11, wherein the first cut-off score is equal to the second cut-off score.

13. The method as recited in claim 10 wherein the steps are completed over the Internet.

14. The method as recited in claim 10 wherein the on-line practice test is a standardized test.

15. The method as recited in claim 10 wherein the step of receiving, from the consumer, a set of answers further includes the step of ceasing to receive the answers a predetermined time after the consumer has started the practice test.

16. The method as recited in claim 10 wherein the step of receiving further includes the step of providing a direct link to the study aid.

17. The method as recited in claim 10 further including the steps of:

assigning the consumer an ID reference;

storing the practice test based on the ID reference pursuant a storage request from the consumer; and retrieving the practice test based on the ID reference pursuant to a retrieval request from the consumer.

18. The method as recited in claim 17 wherein the ID reference is unique.

19. The method of claim 10 wherein the on-line practice test includes a first set of test questions relating to a first skill or content area and a second set of test questions relating to a second skill or content area, and wherein the calculating step includes calculating a first score for the consumer based upon the first set of questions and a second score for the consumer based upon the second set of questions;

and wherein the recommending step includes:

recommending a first study aid to the consumer if the first score is within a first cut-off score range, and recommending a second study aid to the consumer if the second score is within a second cut-off score range.

* * * * *